F. H. SCHRÖDER & H. BECKER.
FIRE DAMP INDICATOR.
APPLICATION FILED NOV. 16, 1910.
989,929.
Patented Apr. 18, 1911.
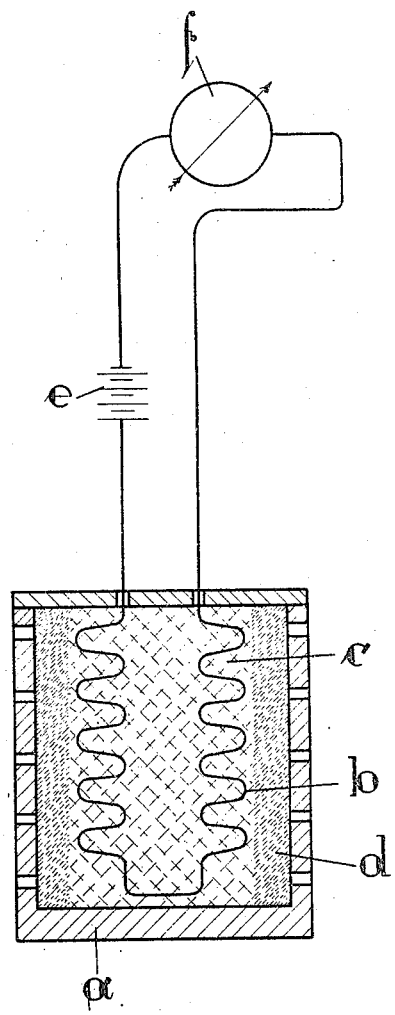
Witnesses:
John Murtagh
Ima Nathan
Inventors:
Friedrich H. Schröder
and Heinrich Becker
by Goepel & Goepel
Attorneys

UNITED STATES PATENT OFFICE.

FRIEDRICH HEINRICH SCHRÖDER AND HEINRICH BECKER, OF RECKLINGHAUSEN, GERMANY.

FIRE-DAMP INDICATOR 989,929.          Specification of Letters Patent.          Patented Apr. 18, 1911.

Application filed November 16, 1910. Serial No. 592,603.

*To all whom it may concern:*

Be it known that we, FRIEDRICH HEINRICH SCHRÖDER and HEINRICH BECKER, subjects of the King of Prussia, German Emperor, and residing at Recklinghausen, Germany, have invented certain new and useful Improvements in Fire-Damp Indicators, of which the following is a specification.

Our invention relates to apparatus for indicating fire-damp.

For indicating combustible gases, *e. g.* fire-damp, it is well-known to utilize the heat produced by such gases in catalytic bodies, *e. g.* spongy platinum. Apparatus has been made heretofore, in which the heat produced in spongy platinum influences an electric circuit by varying the resistance of a conductor. Although these devices can indicate the presence of gases, they can however not be employed in practice, *e. g.* in mines, because the heating of the spongy platinum always leads to the ignition of the explosive mixture.

A primary object of our invention is to provide apparatus of this type, to which this defect is not attached. To this end, we do not employ spongy platinum pure, but mixed with bad conductors of heat. It has been found that the ignition of the explosive gases, *e. g.* fire-damp, is hereby prevented. A mixture of spongy platinum with kieselguhr and asbestos fibers has been found particularly suitable.

One illustrative embodiment of our invention is represented by way of example in the accompanying drawing partly in vertical section and partly diagrammatically.

In the device illustrated the heat produced in the spongy platinum by the gases influences in known manner the resistance of an electric conductor, and the changes in the current caused thereby are indicated by a measuring instrument. It has been found that, in such an arrangement, the indications of the instrument can be made proportional to the percentage of combustible gases.

Referring to the drawing, $a$ designates a vessel, having porous or perforated side walls, containing a wavy resistance wire $b$. This conductor $b$ is embedded in the mixture $c$ of spongy platinum and bad conductors of heat, the mixture being preferably so arranged that the outer layers $d$ thereof contain absolutely no spongy platinum. The variations in the current produced by the battery $e$ are indicated by the instrument $f$ and may be recorded by the same.

We claim:—

1. In means for indicating the presence of combustible gases by means of heat produced by spongy platinum in contact with the gases, the combination with a mixture of spongy platinum and bad conductors of heat, of an electric conductor embedded therein.

2. In means for indicating the presence of combustible gases, the combination with a mixture of spongy platinum with kieselguhr and asbestos fibers, of a conductor of electricity embedded therein.

3. In means for indicating the presence of combustible gases, the combination with a source of current, and an indicating instrument connected with one pole thereof, of a mixture of spongy platinum and a plurality of bad conductors of heat, and a resistance wire having one end connected with said instrument and the other end connected with the other pole of the source of current.

4. In means for indicating the presence of combustible gases, the combination with of a source of current, and an indicating instrument connected with one pole thereof, of a mixture of spongy platinum and a bad conductor of heat, and a resistance wire having one end connected with said instrument and the other end connected with the other pole of the source of current.

FRIEDRICH HEINRICH SCHRÖDER. [L. s.]
HEINRICH BECKER.                [L. s.]

Witnesses:
  CHAS. J. WRIGHT,
  WALTER VONNEGUT.